(12) United States Patent
Chessell

(10) Patent No.: US 6,324,589 B1
(45) Date of Patent: Nov. 27, 2001

(54) APPARATUS, METHOD AND COMPUTER PROGRAM PRODUCT FOR CLIENT/SERVER COMPUTING WITH REDUCED CROSS-PROCESS CALLS

(75) Inventor: Amanda Elizabeth Chessell, Alton (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/076,657

(22) Filed: May 12, 1998

(30) Foreign Application Priority Data

Jan. 7, 1998 (GB) ................................................. 9800283

(51) Int. Cl.[7] ................................................. G06F 15/163
(52) U.S. Cl. ................................................. 709/316
(58) Field of Search ................................................. 709/101, 316

(56) References Cited

U.S. PATENT DOCUMENTS

| 5,363,121 | * | 11/1994 | Freund | 395/600 |
| 5,404,523 | * | 4/1995 | Dellafera et al. | 395/650 |
| 5,768,587 | * | 6/1998 | Freund et al. | 395/671 |
| 5,852,732 | * | 12/1998 | Freund et al. | 395/671 |
| 5,920,863 | * | 7/1999 | McKeehan et al. | 707/10 |

OTHER PUBLICATIONS (Bull) Bull Groupe et al. "Object Transaction Service". p. 1–102, Jun. 1994.*

* cited by examiner

Primary Examiner—Alvin Oberley
Assistant Examiner—Lewis A. Bullock, Jr.
(74) Attorney, Agent, or Firm—Jeanine S. Ray-Yarletts

(57) ABSTRACT

A server for use in a client/server computing system for processing a transaction, the client/server computing system being of at least a three-tier process type, where a first tier process initiates the transaction and contacts a second tier process to further the transaction which in turn contacts a third tier process which contains local data to be updated in the transaction, the server, which runs the second tier process, has a means for receiving a transaction context from the first tier process requesting that the second tier process be registered in the transaction; and a means for passing on the transaction context to the third tier process informing the third tier process that it should register itself into the transaction directly with the first tier process without going through the second tier process. This greatly reduces the required number of cross-process flows.

6 Claims, 4 Drawing Sheets

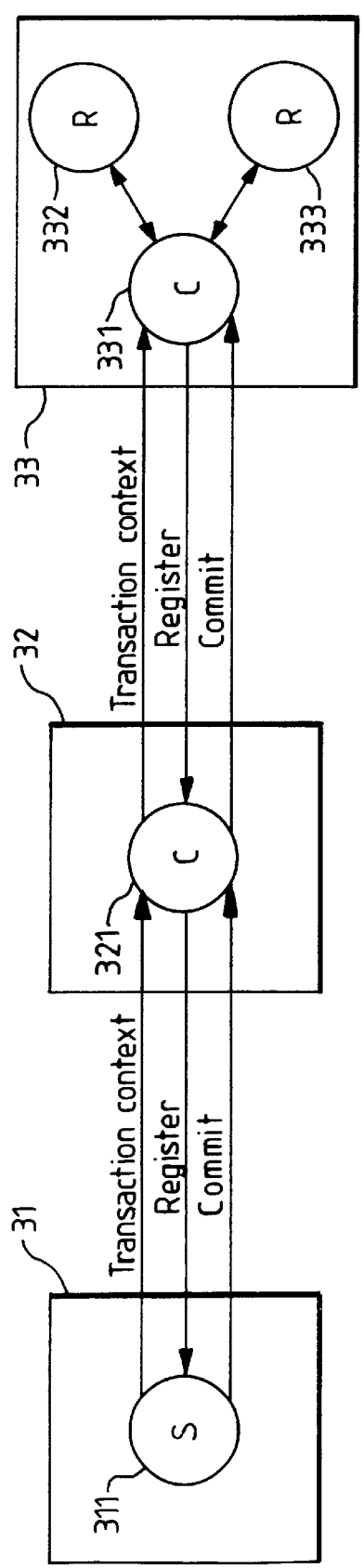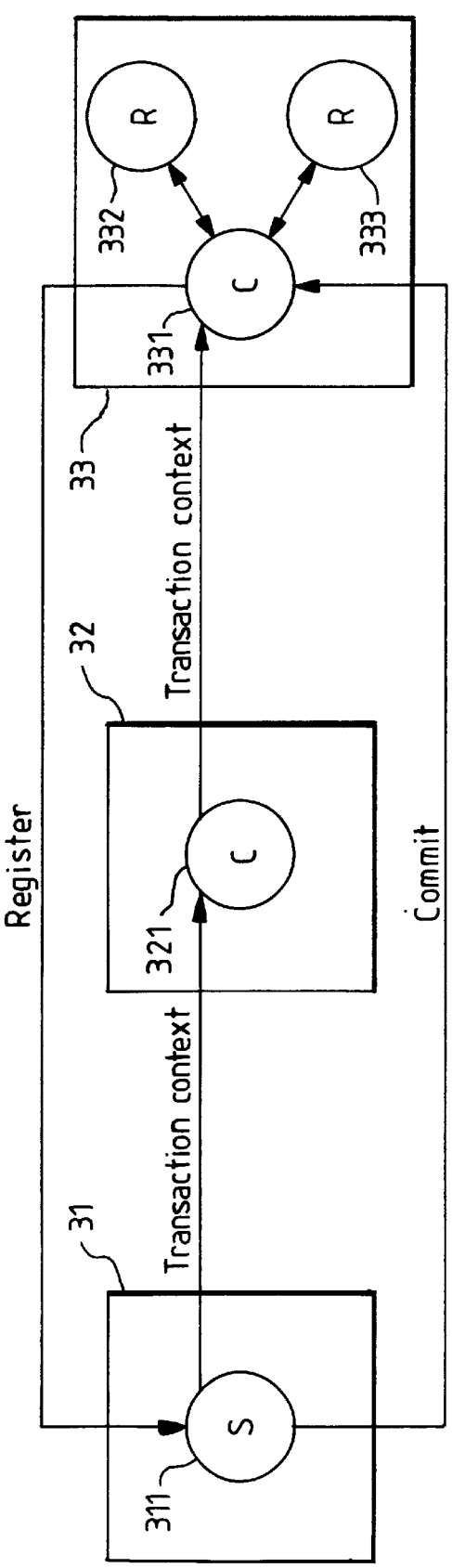

APPARATUS, METHOD AND COMPUTER PROGRAM PRODUCT FOR CLIENT/SERVER COMPUTING WITH REDUCED CROSS-PROCESS CALLS

FIELD OF THE INVENTION

The invention relates to the field of client/server (also known as "distributed") computing, where one computing device ("the client") requests another computing device ("the server") to perform part of the client's work. The client and server can also be both located on the same physical computing device.

BACKGROUND OF THE INVENTION

Client/server computing has become more and more important over the past few years in the information technology world. This type of distributed computing allows one machine to delegate some of its work to another machine that might be, for example, better suited to perform that work. For example, the server could be a high-powered computer running a database program managing the storage of a vast amount of data, while the client is simply a desktop personal computer (PC) which requests information from the database to use in one of its local programs.

The benefits of client/server computing have been even further enhanced by the use of a well-known computer programming technology called object-oriented programming (OOP), which allows the client and server to be located on different (heterogeneous) "platforms". A platform is a combination of the specific hardware/software/operating system/communication protocol which a machine uses to do its work. OOP allows the client application program and server application program to operate on their own platforms without worrying how the client application's work requests will be communicated and accepted by the server application. Likewise, the server application does not have to worry about how the OOP system will receive, translate and send the server application's processing results back to the requesting client application.

Details of how OOP techniques have been integrated with heterogeneous client/server systems are explained in U.S. Pat. No. 5,440,744 and European Patent Published Application No. EP 0 677,943 A2. These latter two publications are hereby incorporated by reference. However, an example of the basic architecture will be given below for contextual understanding of the invention's environment.

As shown in FIG. 1, the client computer 10 (which could, for example, be a personal computer having the IBM OS/2 operating system installed thereon) has an application program 40 running on its operating system ("IBM" and "OS/2 " are trademarks of the International Business Machines corporation). The application program 40 will periodically require work to be performed on the server computer 20 and/or data to be returned from the server 20 for subsequent use by the application program 40. The server computer 20 can be, for example, a high-powered mainframe computer running on IBM's MVS operating system ("MVS" is also a trademark of the IBM corp.). For the purposes of the present invention it is irrelevant whether the requests for communications services to be carried out by the server are instigated by user interaction with the first application program 40, or whether the application program 40 operates independently of user interaction and makes the requests automatically during the running of the program.

When the client computer 10 wishes to make a request for the server computer 20's services, the first application program 40 informs the first logic means 50 of the service required. It may for example do this by sending the first logic means the name of a remote procedure along with a list of input and output parameters. The first logic means 50 then handles the task of establishing the necessary communications with the second computer 20 with reference to definitions of the available communications services stored in the storage device 60. All the possible services are defined as a cohesive framework of object classes 70, these classes being derived from a single object class. Defining the services in this way gives rise to a great number of advantages in terms of performance and reusability.

To establish the necessary communication with the server 20, the first logic means 50 determines which object class in the framework needs to be used, and then creates an instance of that object at the server, a message being sent to that object so as to cause that object to invoke one of its methods. This gives rise to the establishment of the connection with the server computer 20 via the connection means 80, and the subsequent sending of a request to the second logic means 90.

The second logic means 90 then passes the request on to the second application program 100 (hereafter called the service application) running on the server computer 20 so that the service application 100 can perform the specific task required by that request, such as running a data retrieval procedure. Once this task has been completed the service application may need to send results back to the first computer 10. The server application 100 interacts with the second logic means 90 during the performance of the requested tasks and when results are to be sent back to the first computer 10. The second logic means 90 establishes instances of objects, and invokes appropriate methods of those objects, as and when required by the server application 100, the object instances being created from the cohesive framework of object classes stored in the storage device 110.

Using the above technique, the client application program 40 is not exposed to the communications architecture. Further the service application 100 is invoked through the standard mechanism for its environment; it does not know that it is being invoked remotely.

The Object Management Group (OMG) is an international consortium of organizations involved in various aspects of client/server computing on heterogeneous platforms with distributed objects as is shown in FIG. 1. The OMG has set forth published standards by which client computers (e.g. 10) communicate (in OOP form) with server machines (e.g. 20). As part of these standards, an Object Request Broker (called CORBA—the Common Object Request Broker Architecture) has been defined, which provides the object-oriented bridge between the client and the server machines. The ORB decouples the client and server applications from the object oriented implementation details, performing at least part of the work of the first and second logic means 50 and 90 as well as the connection means 80.

As part of the CORBA software structure, the OMG has set forth standards related to "transactions" and these standards are known as the OTS or Object Transaction Service. See, e.g., CORBA Object Transaction Service Specification 1.0, OMG Document 94.8.4. Computer implemented transaction processing systems are used for critical business tasks in a number of industries. A transaction defines a single unit of work that must either be fully completed or fully purged without action. For example, in the case of a bank automated teller machine from which a customer seeks to withdraw money, the actions of issuing the money, reducing the balance of money on hand in the machine and reducing the customer's bank balance must all occur or none of them must occur. Failure of one of the subordinate actions would lead to inconsistency between the records and the actual occurrences.

Distributed transaction processing involves a transaction that affects resources at more than one physical or logical location. In the above example, a transaction affects resources managed at the local automated teller device as well as bank balances managed by a bank's main computer. Such transactions involve one particular client computer (e.g, 10) communicating with one particular server computer (e.g., 20) over a series of client requests which are processed by the server. The OMG's OTS is responsible for coordinating these distributed transactions.

An application running on a client process begins a transaction which may involve calling a plurality of different servers, each of which will initiate a server process to make changes to its local data according to the instructions contained in the transaction. The transaction finishes by either committing the transaction (and thus all servers finalize the changes to their local data) or aborting the transaction (and thus all servers "rollback" or ignore the changes to their local data made during the transaction). To communicate with the servers during the transaction (e.g., instructing them to either commit or abort their part in the transaction) one of the processes involved must maintain state data for the transaction. According to the OTS standard, this involves the process setting up a series of objects, one of which is a coordinator object which coordinates the transaction with respect to the various servers.

The main purpose of this coordinator object is to keep track of which server objects are involved in the transaction, so that when the transaction is finished, each server object involved in the transaction can be told to commit the changes made locally to the local database associated with that server object, in a single unified effort. This ensures that no server object makes a data change final without the other server objects which are also involved in the same transaction doing so. Thus, each server object which is to join a transaction must first register with the coordinator object so that the coordinator object will know of the server object's existence, its wish to join the transaction, and where to find the server object (e.g., which server machine the server object resides on) when it comes time to complete the transaction (where the coordinator object instructs all server objects to make the changes to their respective local data final).

A server object responsible for updating data (referred to hereinbelow as a resource object) gets involved in a transaction when another server object (or the original client object which started the transaction) sends a request to the resource object for the resource object to do some work. This latter request carries some information, called the transaction context, to inform the resource object that the request is part of a transaction. With CORBA version 2, the transaction context is built by the local CosTransactions::Coordinator object get_txcontext method. Once a resource object finds out that it is to be involved in a transaction, it then makes a registration request with the coordinator object.

When the resource object is located in a different operating system process from the coordinator object, it has been found to be useful to use a subordinate coordinator object (222 in FIG. 2) located in the same operating system process as the resource object (223 or 224). The main coordinator object is then called the "superior coordinator object" 211. During registration of a resource object 223 to the transaction, the subordinate coordinator 222 is set up locally inside the server machine 22 which houses the resource object 223 and the resource object 223 communicates directly with this subordinate coordinator object 222 when it makes a registration request. (It should be noted that while the term "server machine" is used here, the term "server process" could also be used, to thus indicate that the distributed server objects could, in fact, be located on the same server machine but on different operating system processes running on the server machine, and hereinafter the term "server" will be used to refer to both terms.) The subordinate coordinator 222, in turn, registers itself with the superior coordinator object 211 (which is located in another process possibly on another server machine as if it were a resource object).

The subordinate coordinator object 222 thus provides a representation of the existence of the transaction within the server housing the resource object. Instead of communicating directly with the superior coordinator object 211, the resource objects 223 and 224 first communicate with their local subordinate coordinator object 222 which in turn communicates with the superior coordinator object. This greatly reduces the number of cross-operating-system-process calls.

However, the number of cross-process calls can still be very high. This is especially true in an increasingly common software architecture where business logic is kept separate from logic which updates data. In such an architecture, there is typically a three-tier software structure where the transaction is started in a first-tier "user-interface" process which calls a second-tier business logic process which in turn calls a third-tier data update logic process. In this architecture, as shown in FIG. 3, the user-interface process 31 contains the superior coordinator object 311 and this object makes a cross-process call to the business logic process 32, passing it the transaction context, which results in a subordinate coordinator object 321 being set up in process 32. Process 32 then makes a cross-process call to the data update logic process 33, passing it the transaction context, which results in a subordinate coordinator 331 being set up in process 33.

It should be noted that because, in this architecture, the data update logic is kept separate from the business logic, the business logic process 32 does not have any server resource objects located locally thereto. This is why the business logic process 32 makes a call to the data update logic process 33 to access such server resource objects (332, 333). When the update logic's subordinate coordinator object 331 is set up it receives the transaction context from the business logic's subordinate coordinator 321. Part of this transaction context is a pointer to the business logic's subordinate coordinator 321 so that the update logic's subordinate coordinator 331 can register itself with the business logic's subordinate coordinator 321. When the transaction is finished, the user interface logic's superior coordinator 311 instructs the business logic's subordinate coordinator 321 to commit any server resource data changes (assuming the transaction was not aborted). The coordinator 321 in turn instructs its registered update logic subordinate coordinator 331 to commit such changes. The latter coordinator 331 then instructs its local resource objects 332, 333 to commit such changes.

In this three-tier architecture, there are many cross process calls which take place, for example, there are six in the simplified illustrated case of FIG. 3. Usually, there would be many different server processes involved and thus the number of cross-process flows can soon become very large. This makes the overall design inefficient and not very cost effective.

SUMMARY OF THE INVENTION

According to a first aspect, the present invention provides a server for use in a client/server computing system for processing a transaction, the client/server computing system being of at least a three-tier process type, where a first tier process initiates the transaction and contacts a second tier process to further the transaction which in turn contacts a third tier process which contains local data to be updated in the transaction, the server, which runs the second tier process, comprising: means for receiving a transaction context from the first tier process requesting that the second tier process be registered in the transaction; and means for passing on the transaction context to said third tier process, informing said third tier process that it should register itself into the transaction directly with the first tier process without going through the second tier process.

Preferably, the first tier process has a superior coordinator and the second and third tier processes each has a subordinate coordinator.

According to a second aspect, the present invention provides a method of carrying out a transaction in a server of a client/server computing system, the client/server computing system being of at least a three-tier process type, where a first tier process initiates the transaction and contacts a second tier process to further the transaction which in turn contacts a third tier process which contains local data to be updated in the transaction, the method, which takes place in the second tier process, comprising steps of: receiving a transaction context from the first tier process requesting that the second tier process be registered in the transaction; and passing on the transaction context to said third tier process, informing said third tier process that it should register itself into the transaction directly with the first tier process without going through the second tier process.

According to a third aspect, the invention provides a computer program, stored on a computer-readable storage medium, the program having program elements for, when run on a computer, performing the method set forth in the second aspect of the invention.

According to a fourth aspect, the invention provides a server for use in a client/server computing system for processing a transaction, the client/server computing system being of at least a three-tier process type, where a first tier process initiates the transaction and contacts a second tier process to further the transaction which in turn contacts a third tier process which contains local data to be updated in the transaction, the server, which runs the third tier process, comprising: means for receiving a transaction context from the second tier process requesting that the third tier process be registered in the transaction, said transaction context including an indication that said third tier process should register itself into the transaction directly with the first tier process without going through the second tier process; and means for registering into said transaction directly with said first tier process upon receiving said transaction context without going through said second tier process.

According to a fifth aspect, the invention provides a method of carrying out a transaction in a server of a client/server computing system, the client/server computing system being of at least a three-tier process type, where a first tier process initiates the transaction and contacts a second tier process to further the transaction which in turn contacts a third tier process which contains local data to be updated in the transaction, the method, which takes place in the third tier process, comprising steps of: receiving a transaction context from the second tier process requesting that the third tier process be registered in the transaction, said transaction context including an indication that said third tier process should register itself into the transaction directly with the first tier process without going through the second tier process; and registering into said transaction directly with said first tier process upon receiving said transaction context without going through said second tier process.

According to a sixth aspect, the invention provides a computer program, stored on a computer-readable storage medium, the program having program elements for, when run on a computer, performing the method set forth in the second aspect of the invention.

With the present invention, since the third tier process (data update logic process) registers directly with the first tier process (where the superior coordinator is located) without going through the second tier process, and since the superior coordinator sends a commit command directly to the third tier process without going through the second tier process, many cross-process flows are eliminated. This results in a very efficient and cost-effective system.

Further, the reduction in the number of message flows is achieved without requiring any changes to be made to the CORBA specified interfaces, thus allowing complete compatibility with this OMG standard.

BRIEF DESCRIPTION OF THE DRAWINGS

The invention will be better understood by the below description of preferred embodiments thereof to be read while referring to the following figures.

FIG. 3 is a block diagram showing the various objects instantiated within and process calls between three co-transactional servers according to a conventional system;

FIG. 4 is a block diagram showing the various objects instantiated within and process calls between three co-transactional servers according to a preferred embodiment of the present invention.

DETAILED DESCRIPTION OF THE PREFERRED EMBODIMENTS

Figure 1:
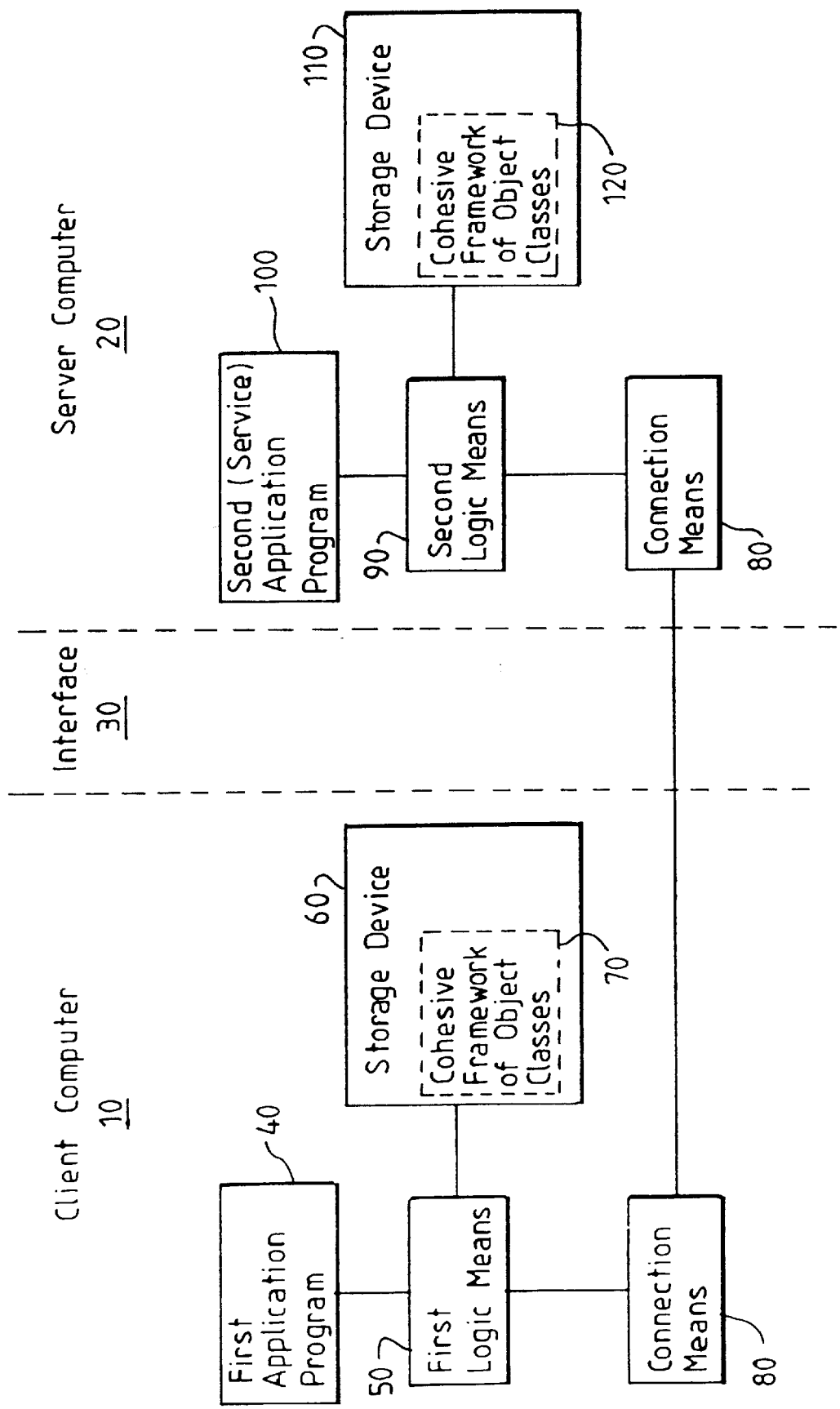
FIG. 1 is a block diagram of a well-known heterogeneous client/server architecture using object technology, in the context of which preferred embodiments of the present invention can be applied.
Figure 2:
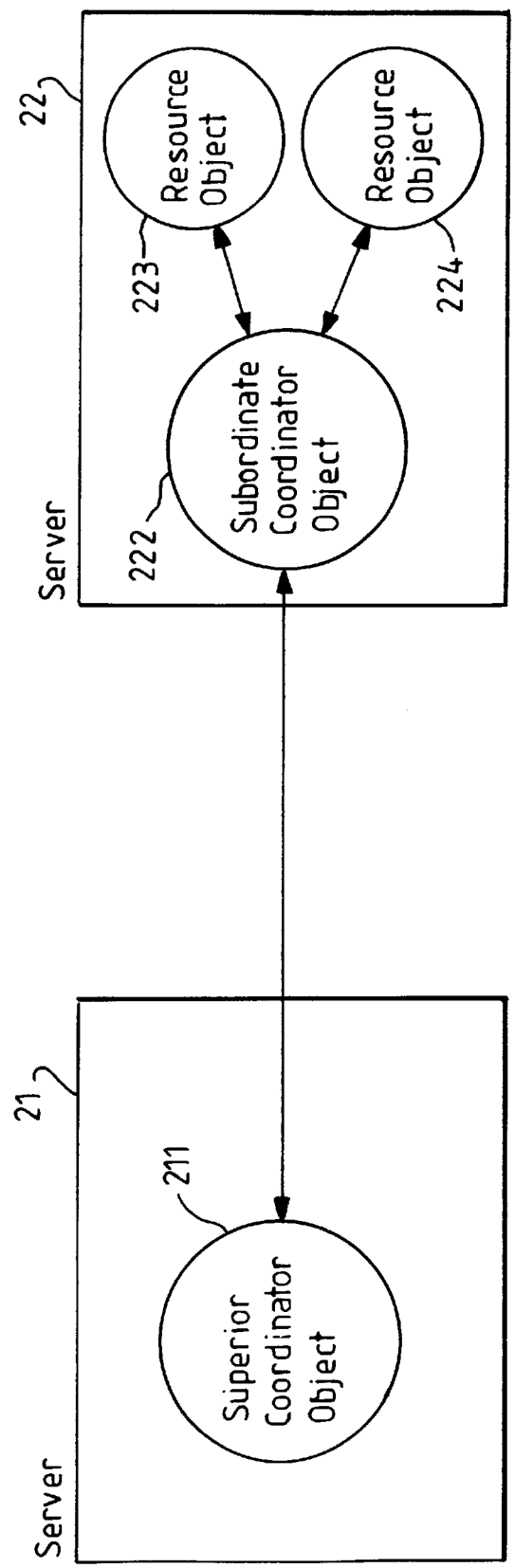
FIG. 2 is a block diagram showing the various objects instantiated within two co-transactional servers according to a conventional system.

FIG. 4 is very similar to FIG. 3 and will be used to compare with FIG. 3 in order to clearly show the advantages of the present invention. By comparison of FIGS. 3 and 4, it can be easily seen that the number of cross-process flows has been greatly reduced from six to four.

When the transaction begins, the user-interface process 31 contains the superior coordinator object 311 and this object makes a cross-process call to the business logic process 32, passing it the transaction context, which results in a subordinate coordinator object 321 being set up in process 32. Process 32 then makes a cross-process call to the data update logic process 33, passing it the transaction context, which results in a subordinate coordinator 331 being set up in process 33. This is all identical to the prior art of FIG. 3 and is well known according to the CORBA specification (e.g., CORBA version 2.0).

However, the difference in the preferred embodiment of the present invention is that when the subordinate coordinator object 321 builds the transaction context to pass to the update logic process 33, for example during the CosTransactions::Coordinator::get_txcontext( ) method, the object 321 does not insert a pointer back to itself in the transaction context. Rather, because the coordinator object 321 does not have any local resources (e.g., 332, 333) in its process 32, the coordinator 321 inserts into the transaction context a pointer back to the coordinator 321's superior coordinator 311. Thus, when the subordinate coordinator 331 is created and receives the transaction context from coordinator 321, it sends a registration request directly back to the superior coordinator 311 (see upper line in FIG. 4).

Also, the subordinate coordinator 321 does not need to register itself with the superior coordinator 311, since the coordinator 321 no longer needs to be involved in the commit process, since there are no local resource objects registered with it and the coordinator 331 communicates directly with the superior coordinator 311.

So, when the transaction is finished, the superior coordinator 311 sends a commit command directly to the coordinator 331 without first sending such a command to the intermediate coordinator 321.

The number of cross-process calls is greatly reduced. First, there is no need for the intermediate coordinator 321 to register with the superior coordinator 311, thus saving one cross-process call. Second, there is no need for the superior coordinator 311 to send a cross-process commit call to the intermediate coordinator 321, thus saving at least one more cross-process call (depending on whether a one phase commit or two phase commit is used). In a typical system, there could be many intermediate coordinator's 321 and many final coordinators 331. Thus, the two-call savings shown by comparing FIGS. 3 and 4 is greatly multiplied when a typical software system of this type is actually implemented, especially since two phase commit (involving two calls to each registered resource) is required by a coordinator that has more than one resource object registered.

Figure 5:
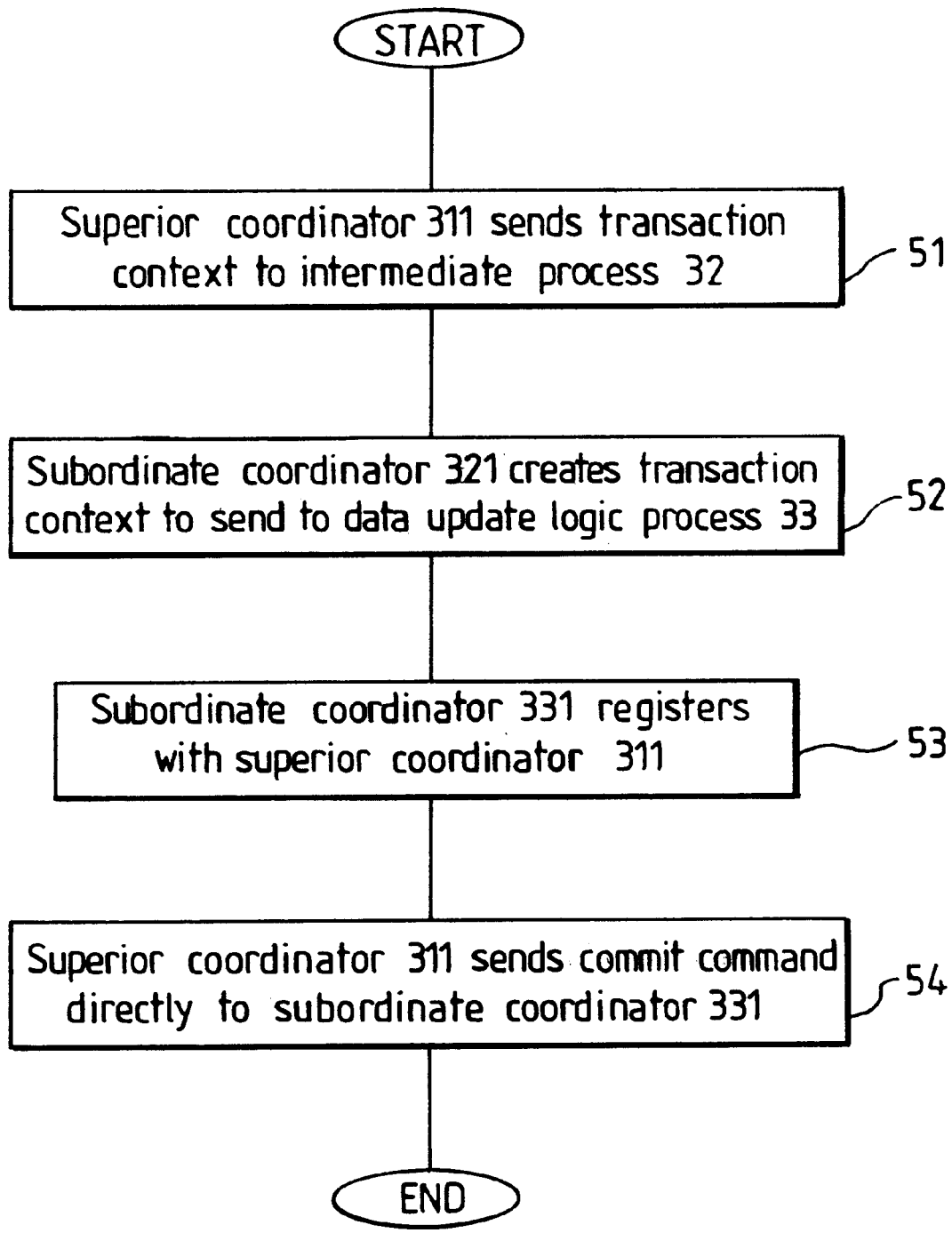
FIG. 5 is a flowchart showing the steps involved within a server, according to a preferred embodiment of the present invention.

The actual operation of the preferred embodiment will now be described with reference to the flowchart of FIG. 5.

At step 51, the superior coordinator 311 sends the transaction context to the intermediate process 32, thus creating the subordinate coordinator 321. Included in this transaction context is the object reference of the superior coordinator 311 that is required by the subordinate coordinator to register with the superior coordinator 311. However, as the subordinate coordinator 321 does not have any local server resources, it does not so register with the superior coordinator 311. Instead, at step 52, the subordinate coordinator 321 creates the transaction context to send to the data update logic process 33, thus creating the subordinate coordinator 331. Included in this transaction context is the object reference of the coordinator that the subordinate coordinator 331 should register with. Subordinate coordinator 321 supplies the object reference for superior coordinator 311 rather than its own object reference. At step 53, the subordinate coordinator 331 registers with the superior coordinator 311.

Later, when the transaction is completed, the superior coordinator 311 sends (step 54) the commit requests directly to the subordinate coordinator 331 (since this latter coordinator has previously registered itself with the superior coordinator at step 53).

I claim:

1. A method of carrying out a transaction in a server of a client/server computing system, the client/server computing system being of at least a three-tier process type, where a first tier process initiates the transaction and contacts a second tier process to further the transaction which in turn contacts a third tier process which contains local data to be updated in the transaction, the method, which takes place in the second tier process, which has no local data to be updated in the transaction, comprising steps of:

receiving a first transaction context from the first tier process requesting that the second tier process be registered in the transaction, said first transaction context including a reference to the first tier process to thus inform the second tier process that the second tier process should register into the transaction with the first tier process;

upon receiving the first transaction context and because the second tier process has no local data to be updated in the transaction, creating a second transaction context for sending to the third tier process, said second transaction context including a reference to the first tier process to thus inform the third tier process that the third tier process should register into the transaction with the first tier process, wherein if the second tier process had local data to be updated in the transaction the second tier process would instead create the second transaction context with a reference to the second tier process; and passing on the second transaction context to said third tier process thus informing said third tier process that it should register itself into the transaction directly with the first tier process without going through the second tier process.

2. The method of claim 1 wherein said first tier process has a superior coordinator and the second and third tier processes each has a subordinate coordinator.

3. A computer program product, stored on a computer readable storage medium, the program having program elements for, when run on a computer system, performing the method of claim 1.

4. The computer program product of claim 1 wherein said first tier process has a superior coordinator and the second and third tier processes each has a subordinate coordinator.

5. A server for use in a client/server computing system for processing a transaction, the client/server computing system being of at least a three-tier process type, where a first tier process initiates the transaction and contacts a second tier process to further the transaction which in turn contacts a third tier process which contains local data to be updated in the transaction, the server, which runs the second tier process, and which has no local data to be updated in the transaction, comprising:

means for receiving a first transaction context from the first tier process requesting that the second tier process be registered in the transaction, said first transaction context including a reference to the first tier process to thus inform the second tier process that the second tier process should register into the transaction with the first tier process;

means for, upon receiving the first transaction context and because the second tier process has no local data to be updated in the transaction, creating a second transaction context for sending to the third tier process, said second transaction context including a reference to the first tier process to thus inform the third tier process that the third tier process should register into the transaction with the first tier process, wherein if the second tier process had local data to be updated in the transaction the second tier process would instead create the second transaction context with a reference to the second tier process; and means for passing on the second transaction context to said third tier process thus informing said third tier process that it should register itself into the transaction directly with the first tier process without going through the second tier process.

6. The server of claim 5 wherein said first tier process has a superior coordinator and the second and third tier processes each has a subordinate coordinator.

* * * * *